March 2, 1937.  J. ROBINSON  2,072,382
COUNTER CURRENT CONTACTOR
Filed March 28, 1935
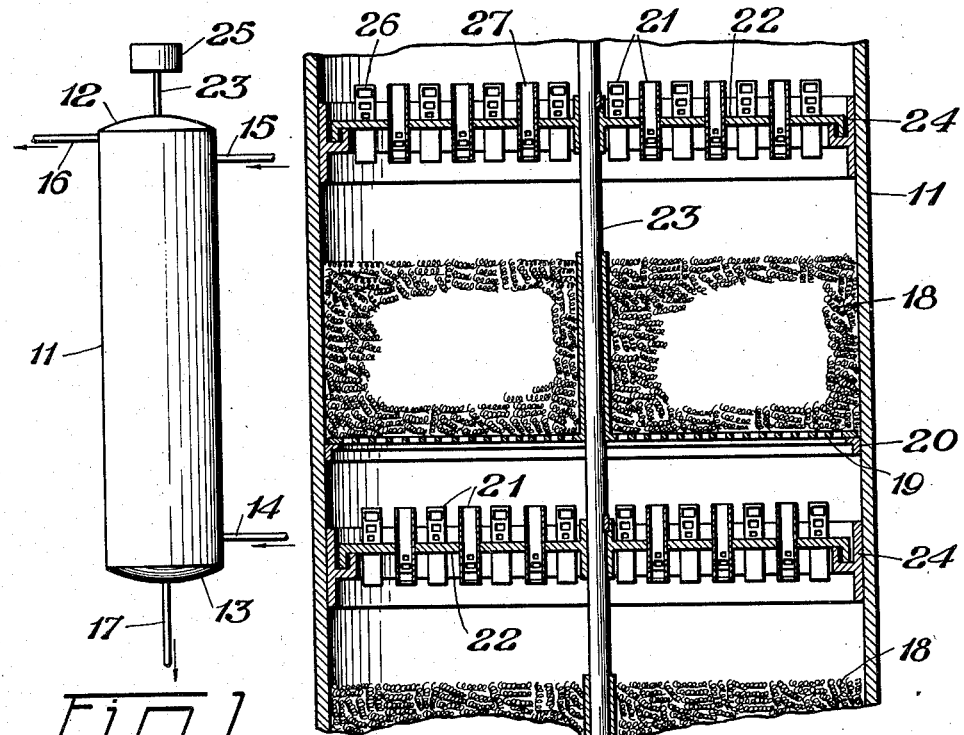
Fig. 1
Fig. 2
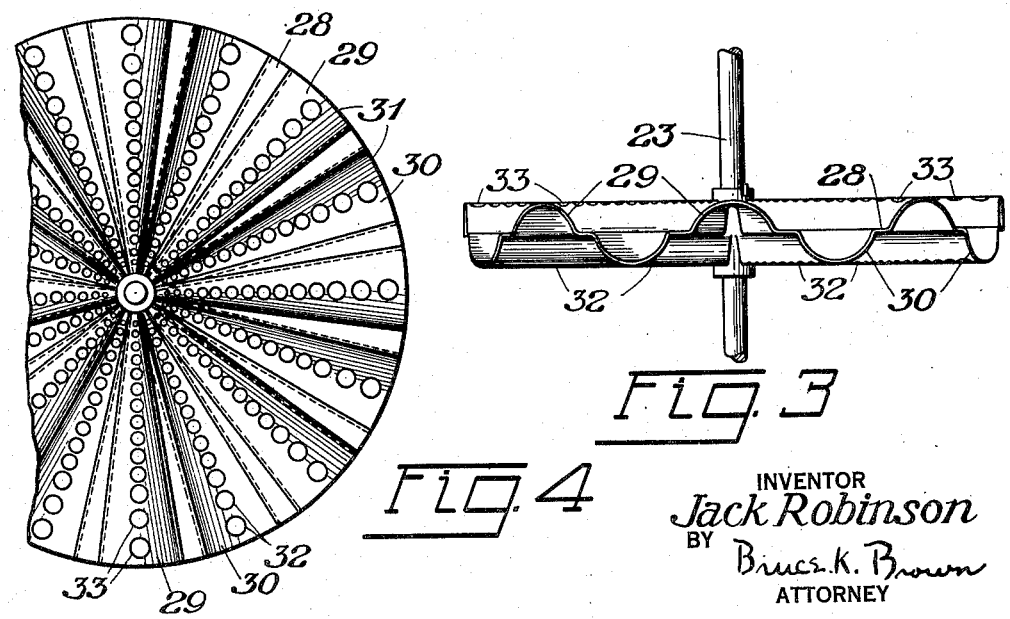
Fig. 3
Fig. 4
INVENTOR
Jack Robinson
BY Bruce K. Brown
ATTORNEY Patented Mar. 2, 1937

2,072,382

UNITED STATES PATENT OFFICE 2,072,382

COUNTER CURRENT CONTACTOR

Jack Robinson, East Alton, Ill., assignor to Standard Oil Company, Chicago, Ill., a corporation of Indiana Application March 28, 1935, Serial No. 13,422

6 Claims. (Cl. 23—270)

This invention relates to the art of contacting two liquids differing substantially in specific gravity and immiscible or only partially miscible with each other under the conditions at which they are contacted.

This contacting problem is important in a large number of industrial applications to which my invention is applicable, but one of its most important applications, and the one to which my invention has particular reference, is the extraction of oils by means of selective solvents. It is known that lubricating oil stocks, burning stocks and gasoline stocks can be extracted with a large list of known selective solvents or selective solvent mixtures in order to produce two oil fractions differing markedly in chemical and physical properties from each other. The contacting of the oil and selective solvent can be performed in various ways. Thus, the two can be heated together above their miscibility temperature and can then be cooled to produce the desired two phases. Similar results can be obtained by pressure variations in some cases. Another method is to agitate the oil and selective solvent together at temperatures below the miscibility temperature and then separate the desired two phases.

The aforementioned contacting methods are single stage methods and are characterized by a very incomplete separation of the oil into its two groups of constituents. The art has therefore largely turned to countercurrent methods of contacting in which the separation of the two groups of constituents can be carried more nearly to completion. The commonest countercurrent method is the use of a plurality of one stage steps. Thus, the oil and solvent are contacted in a mixer, separated in a settler, and the separated materials pass in opposite directions to other mixing and separating steps, each of which pairs of steps constitutes a "stage". As many as 7 or 8 stages may be used. This type of process, which may be referred to as a batch countercurrent process, requires a large amount of equipment, including a large number of expensive pumps which not only increase the cost and difficulty of operation but provide opportunities for leakage and solvent losses. Other types of countercurrent contacting equipment have therefore been proposed and used. Much of this equipment has been highly complicated and none of it has been completely satisfactory.

The simplest method of countercurrent contacting and one well known to the art involves the use of a vertical tower, the light liquid being introduced near the bottom, the heavy liquid being introduced near the top, and the two passing in countercurrent flow with respect to each other and being removed from the ends of the tower respectively opposite the ends at which they were introduced. The point of withdrawal of the heavy liquid is below the point of admission of the light liquid and the point of withdrawal of the light liquid is above the point of admission of the heavy liquid.

Towers of this type may be baffled to provide tortuous flow or may be packed with some type of filler for this same purpose. Such towers work very nicely in laboratory sizes but have generally been found impracticable when expanded to the dimensions necessary for plant scale operations in the petroleum industry. This impracticability appears to be due to the fact that the ascending liquid and the descending liquid do not remain evenly distributed throughout the tower but tend to reduce their respective flow resistances by ascending or descending in segregated streams. This is known as "channeling". In extreme cases the heavy liquid will descend on one side of the tower and the light liquid ascend on the other, with the result that very little contacting is accomplished. Thus, a very large tower which might be expected to be equivalent to 6 or 7 stages in a batch countercurrent process may be found to be equivalent to one or two at most.

It is an object of my invention to overcome this difficulty in the use of vertical countercurrent contacting towers by providing means for the redistribution of the ascending and/or descending streams at intervals throughout the tower. Other and more detailed objects of my invention will become apparent as the description thereof proceeds.

Reference will now be had to the accompanying drawing which form a part of this specification and in which Figure 1 is a diagrammatic elevation of a tower of the type to which my invention is particularly applicable;

Figure 2 is a vertical sectional view of a portion of a tower in accordance with my invention;

Figure 3 is an elevational view of an alternative redistribution mechanism; and

Figure 4 is a partial plan view of the redistribution mechanism shown in Figure 3.

Referring now to the drawing in more particular, Figure 1 shows a tower formed by shell 11, top closure 12 and bottom closure 13. The lighter liquid, which is my preferred embodiment is a lubricating oil or other petroleum oil, is admitted near the bottom of the tower through inlet 14 and is preferably distributed throughout the cross-section of the tower by some suitable means such as a series of perforated pipe rings. Similarly the heavy liquid, which in my preferred embodiment is a selective solvent (since most of the known selective solvents have specific gravities greater than that of oil) is introduced near the top of the tower through inlet 15. The oil then passes upward and the solvent downward due to the difference in their specific gravities. The ascending oil passes beyond the point of introduction of the solvent and is removed from the tower through outlet 16. Similarly the descending solvent passes beyond the point of introduction of the oil and is removed from the tower through outlet 17. These features are well known in the art and are therefore not described in detail. My invention is concerned with the intermediate portion of the tower, which is normally either empty, packed with some type of filler or equipped with baffles of one sort or another.

The tower of my invention is broken up into a plurality of stages which may, for instance, be from 3 to 20 and preferably from 5 to 15 in number. These stages are located between inlets 14 and 15. Each stage approaches an ideal batch countercurrent stage, or, in other words, approaches the results obtained by perfect contacting and perfect separation. Each of the stages in my tower is composed of two parts, a contacting part and a liquid redistribution part. In the form shown in Figure 2, the contacting part consists of a layer of packing 18 supported on a perforated plate 19 which is in turn fastened to a ring 20 welded to shell 11. The packing 18 may be of any known type such as pieces of ceramic material, Raschig rings, etc., but I prefer to use small metallic springs, as shown, since I find this type of packing material highly satisfactory. The layer of packing may be of any desired height, for instance, from half the diameter of the tower to the diameter of the tower. Instead of using a packed space for the contacting portion of each of my stages, I can use a series of baffles, or even an empty space, but I strongly prefer to use the packing as described.

The second portion of each of my stages is the liquid redistribution means. In the form shown in Figure 2 this is made up of a series of pipes 21 supported in a partition 22 which is keyed or otherwise fastened to a shaft 23. Partition 22 is supported by a U-shaped ring 24 welded to shell 11. The ascending and descending liquids collect in pools respectively below and above partition 22 and then pass through pipes 21. These pipes, together with partition 22 are rotated by means of shaft 23 which is driven through pulley or gear 25 by a power source not shown. Since the two liquids spend a considerable amount of time in the pools adjacent partition 22 and/or in passing through pipes 21, they are necessarily carried around with the partition and pipes while passing therethrough. The result of this is that if the liquid in one portion of the tower "channels" so that the bulk of the ascending or descending liquid passes upward or downward, as the case may be, along one side of the tower, a portion of this liquid is carried around with partition 22 and pipes 21 and passes out of those pipes on the opposite side of the tower from that on which it originally accumulated. Thus "channeling" is limited and redistribution is effected periodically.

In the form shown in Figure 2, pipes 21 are divided into alternate downcomers 26 and upcomers 27 by the use of openings in these pipes located above partition 22 in the case of the downcomers and below it in the case of the upcomers. This is not essential, however, and plain pipes without openings can be used through which both liquids pass.

The pools of liquid above and below partition 22 can be made to rotate more positively with the partition by the use of radial baffles and the redistribution of the two liquids is thereby enhanced. It is to be understood, however, that this is not essential nor is it always essential that pools be collected at all since redistribution is effected while the liquids are passing through pipes 21.

Figures 3 and 4 show an alternative device for the redistribution of the two liquids. It is designed for use in the type of tower shown in Figures 1 and 2 and replaces elements 21, 22, 24, 26 and 27 of Figure 2. The device of Figures 3 and 4 is composed of a circular partition 28 provided with alternate convex radial channels 29 and concave channels 30 which divide the partition into sectors 31. Pools of ascending liquid collect in channels 29, while pools of descending liquid accumulate in channels 30. The concave channels are provided with openings 32 at their bottoms and the convex channels with openings 33 at their tops. The openings are larger or more numerous toward the outer end of the channel in order to secure uniform distribution throughout the cross sectional area of the tower. Preferably, the aggregate areas of said openings are approximately proportional to the squares of their respective distances from the axis of rotation.

The device of Figures 3 and 4, like the device of Figure 2, tends to carry a portion of the material ascending or descending on one side of the tower around to the other side of the tower, thereby preventing "channeling" and insuring uniform distribution of the ascending and descending liquids at all parts of the tower.

The rate of rotation of shaft 23 will depend on the size of the tower, the size of the openings 32 and 33, the rates of feed, the viscosity of the materials involved, etc. It will, in general, however, be too low to produce any substantial agitation and its purpose is not the production of agitation, but the redistribution of the ascending and descending liquids. Baffles may be placed radially to prevent swirling. The speed of rotation should, in general, be such that the average time that any given particle of liquid remains in one of the pools adjacent the partition is approximately equal to the time required for the pool to rotate through 180° so that the average particle is carried half way around. Some particles will, of course, pass through immediately and others will be carried completely around, while still others will follow every intermediate possibility. Thus, any given portion of liquid will gradually be released over the entire periphery of a horizontal circle within the tower. Also by collecting and redistributing the oil and solvent at frequent intervals in the tower I obtain uniform operation and "balance" in all sections of the tower.

Instead of using a rotating partition I can use a stationary perforated partition with rotating distribution means located above and/or below the partition.

While I have described my invention in connection with certain specific embodiments thereof, I do not wish to be limited thereby but only to the liberal scope of the appended claims in which I have defined the novel features of my invention.

I claim:

1. A liquid collection and redistribution means for a vertical countercurrent contactor for contacting two liquids differing in specific gravity and at least partially immiscible with each other comprising a circular partition, means for rotating said partition, said partition being divided into sectors for the collection of sector-shaped pools of liquid adjacent said partition, means for permitting liquid from said pools to pass through said partition while said partitions and said pools are rotated, whereby said liquid is distributed substantially uniformly throughout the cross sectional area of said contactor after passing through said partition.

2. A liquid collection and redistribution means for a vertical countercurrent contactor for contacting two liquids differing in specific gravity and at least partially immiscible with each other comprising a circular partition made up of alternate convex and concave sectors, and means for rotating said partition, said sectors being equipped with openings at the tops of the convex sectors and at the bottoms of the concave sectors.

3. A device according to claim 2 in which the aggregate areas of said openings are approximately proportional to the squares of their respective distances from the axis of rotation.

4. A vertical tower for the countercurrent contacting of a light liquid and a heavy liquid, said two liquids differing in specific gravity and being at least partially immiscible with each other, comprising a shell, bottom and top closures for said shell, means located near the bottom of said shell for the admission of said light liquid, means located near the top of said shell for the admission of said heavy liquid, means located near the top of said shell for the withdrawal of said light liquid after countercurrent contact with said heavy liquid, means located near the bottom of said shell for the withdrawal of said heavy liquid after countercurrent contact with said light liquid, a plurality of spaced contact zones located within said shell between said first mentioned means and said second mentioned means, and a liquid collection and redistribution means located between adjacent contact zones, said last mentioned means comprising a substantially horizontal rotatable partition extending across said shell for causing a pool of one of said liquids to collect adjacent to said partition, and means for rotating said partition with respect to said shell about an axis parallel to the axis of said shell, said partition including means projecting into said pool to cause said pool to rotate with said partition and means for permitting liquid from said pool to pass through said partition in a plurality of restricted streams while rotating with said partition, whereby said liquid is distributed substantially uniformly throughout the cross sectional area of said shell after passing through said partition.

5. A vertical tower for the countercurrent contacting of a light liquid and a heavy liquid, said two liquids differing in specific gravity and being at least partially immiscible with each other, comprising a shell, bottom and top closures for said shell, means located near the bottom of said shell for the admission of said light liquid, means located near the top of said shell for the admission of said heavy liquid, means located near the top of said shell for the withdrawal of said light liquid after countercurrent contact with said heavy liquid, means located near the bottom of said shell for the withdrawal of said heavy liquid after countercurrent contact with said light liquid, a plurality of spaced contact zones located within said shell between said first mentioned means and said second mentioned means, and a liquid collection and redistribution means located between adjacent contact zones, said last mentioned means comprising a substantially horizontal rotatable partition extending across said shell, said partition including means projecting into the liquid collected adjacent to said partition and adapted to cause liquid adjacent to said partition to rotate with said partition, said partition being perforated to permit liquid adjacent to said partition to pass through said partition gradually in a plurality of restricted streams while rotating with said partition, and means for rotating said partition with respect to said shell about an axis parallel to the axis of said shell, whereby said liquid is distributed substantially uniformly throughout the cross sectional area of said shell after passing through said partition.

6. A liquid collection and redistribution means for a vertical countercurrent contactor for contacting two liquids differing in specific gravity and at least partially immiscible with each other comprising a circular partition, means for rotating said partition, means projecting through said partition for permitting liquid from a pool collected adjacent to said partition to pass through said partition and for causing the liquid passing through said partition to rotate with said partition, whereby said liquid is distributed substantially uniformly throughout the cross sectional area of said contactor after passing through said partition.

JACK ROBINSON.